United States Patent
Lee

(10) Patent No.: US 8,914,202 B2
(45) Date of Patent: Dec. 16, 2014

(54) CLAMP FORCE CONTROL METHOD FOR CONTINUOUS VARIABLE TRANSMISSION

(75) Inventor: Hoyoung Lee, Bucheon-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 487 days.

(21) Appl. No.: 13/287,835

(22) Filed: Nov. 2, 2011

(65) Prior Publication Data

US 2012/0244972 A1  Sep. 27, 2012

(30) Foreign Application Priority Data

Mar. 22, 2011  (KR) .................. 10-2011-0025265

(51) Int. Cl.
*F16H 61/662* (2006.01)
*F16H 55/56* (2006.01)

(52) U.S. Cl.
CPC .............................. *F16H 61/66272* (2013.01)
USPC ........................................................ 701/51

(58) Field of Classification Search
USPC ................................................ 701/51; 474/8
See application file for complete search history.

(56) References Cited

U.S. PATENT DOCUMENTS

| | | | |
|---|---|---|---|
| 7,300,380 B2 | 11/2007 | Iwatsuki et al. | |
| 2004/0242355 A1 | 12/2004 | Yamaguchi et al. | |
| 2005/0251315 A1* | 11/2005 | Tanaka et al. | 701/51 |
| 2008/0153636 A1* | 6/2008 | Inoue et al. | 474/28 |
| 2010/0198467 A1* | 8/2010 | Van Der Noll | 701/51 |

FOREIGN PATENT DOCUMENTS

| | | |
|---|---|---|
| JP | 2004-353703 A | 12/2004 |
| JP | 2005-98328 A | 4/2005 |
| JP | 2005-106209 A | 4/2005 |
| JP | 2005-147271 A | 6/2005 |
| JP | 2005-249061 A | 9/2005 |
| JP | 2009-236133 A | 10/2009 |
| KR | 10-0750543 B1 | 8/2007 |
| KR | 10-2010-0106928 A | 10/2010 |
| WO | WO 2004/102041 A1 | 11/2004 |

* cited by examiner

*Primary Examiner* — Edwin A Young
(74) *Attorney, Agent, or Firm* — Morgan, Lewis & Bockius LLP

(57) ABSTRACT

A clamp force control method for a continuous variable transmission may include a first process that fixes clamp force of any one of a driving pulley and a driven pulley, and a second process that finds a section where a transmission ratio may be the minimum while gradually decreasing the clamp force from a current clamp force of the other pulley of which the clamp force may not be fixed in the first process and sets the clamp force in the section where the transmission ratio may be the minimum as the clamp force of the other pulley, which may not be fixed.

3 Claims, 3 Drawing Sheets

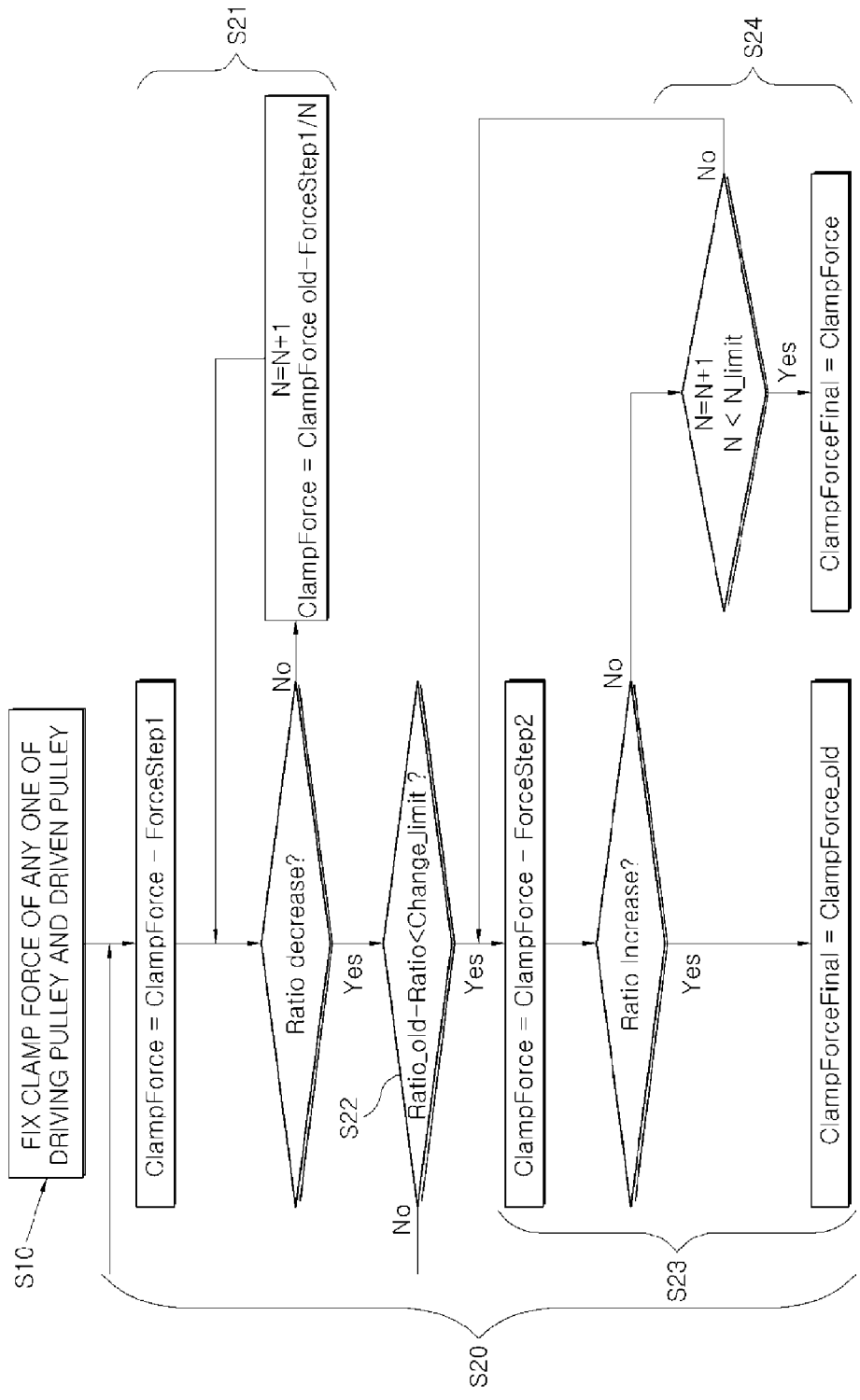

CLAMP FORCE CONTROL METHOD FOR CONTINUOUS VARIABLE TRANSMISSION

CROSS-REFERENCE TO RELATED APPLICATIONS

The present application claims priority to Korean Patent Application Number 10-2011-0025265 filed Mar. 22, 2011, the entire contents of which application is incorporated herein for all purposes by this reference.

BACKGROUND OF THE INVENTION

1. Field of the Invention

The present invention relates to a method of controlling clamp force exerted in the pulley of a CVT (Continuously Variable Transmission) composed of a belt and pulleys, and more particularly, to a technology that can improve efficiency of a CVT by minimizing clamp force exerted in a pulley as low as possible.

2. Description of Related Art

CVTs composed of a belt and pulleys can continuously control a transmission ratio by controlling hydraulic pressure applied to a driving pulley and a driven pulley.

Since slip should not be generated between the pulleys and the belt in the CVTs, it is necessary to provide clamp force at an appropriate level in the axial directions of the pulleys; however, when unnecessarily too high hydraulic pressure is supplied, energy is wasted, the efficiency of the CVTs is decreased, and the fuel efficiency of the vehicle is reduced.

Therefore, it is required to find and control the optimum point of the clamp force to prevent slip between the pulleys and the belt and a method of determining the final clamp force by multiplying clamp force theoretically calculated by a safety coefficient, determining the point where slip between the belt and the pulleys starts to be generated as a point where the safety coefficient is 1 to decrease the safety coefficient as low as possible, and reducing the clamp force to the point is used in order to find and control the optimum point in the related art.

However, as shown in FIG. 1, the relationship between the clamp force F and the slip is unclear because reduction of clamp force F and a change of a slip ratio Sr do not make a simple corresponding relationship, but as the clamp force F decreases at a constant ratio, the slip ration Sr nonlinearly changes, such that it is difficult to determine the section where the safety coefficient is 1 and a high-performance and high-accuracy sensor needs to be added to detect and use slip for control.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a control method of clamp force for a CVT that contributes to improving efficiency of the CVT and fuel efficiency of a vehicle by finding the optimum clamp force between pulleys and a belt without using an additional part, such as high-performance sensor.

In an aspect of the present invention, the clamp force control method for a continuous variable transmission, may include a first process that fixes clamp force of any one of a driving pulley and a driven pulley, and a second process that finds a section where a transmission ratio may be the minimum while gradually decreasing the clamp force from a current clamp force of the other pulley of which the clamp force may not be fixed in the first process and sets the clamp force in the section where the transmission ratio may be the minimum as the clamp force of the other pulley, which may not be fixed.

The second process may include a first step that gradually decreases the clamp force from the current clamp force of the other pulley of which the clamp force may not be fixed in the first process and decreases the clamp force by the force determined by the first reduction force/the number of times as the number of times increases until the transmission ratio may be decreases from a predetermined first reduction force, a second step that repeats the first step until the amount of change of the transmission ratio becomes under a predetermined first limit value when the transmission ratio may be decreases, as a result of the first step, and a third step that further decreases the clamp force after the second step and determines as final clamp force the clamp force right before the transmission ratio increases while repetitively decreasing the clamp force by a predetermined second reduction force until the transmission ratio increases.

The method may further include a fourth step that determines the current clamp force as the final clamp force, when the number of times that decreases the clamp force by the second reduction force becomes equal to or more than a predetermined limit number of times in the third step.

The second reduction force may be set smaller than the first reduction force.

According to exemplary embodiments of the present invention, it is possible to contribute to improving efficiency of a CVT and fuel efficiency of a vehicle by finding the optimum clamp force between pulleys and a belt and controlling the pulley in accordance with the clamp force, without using an additional part, such as a high-performance sensor.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 3 is a flowchart illustrating an exemplary embodiment of a control method for CVT clamp force according to an exemplary embodiment of the present invention.

Figure 1:
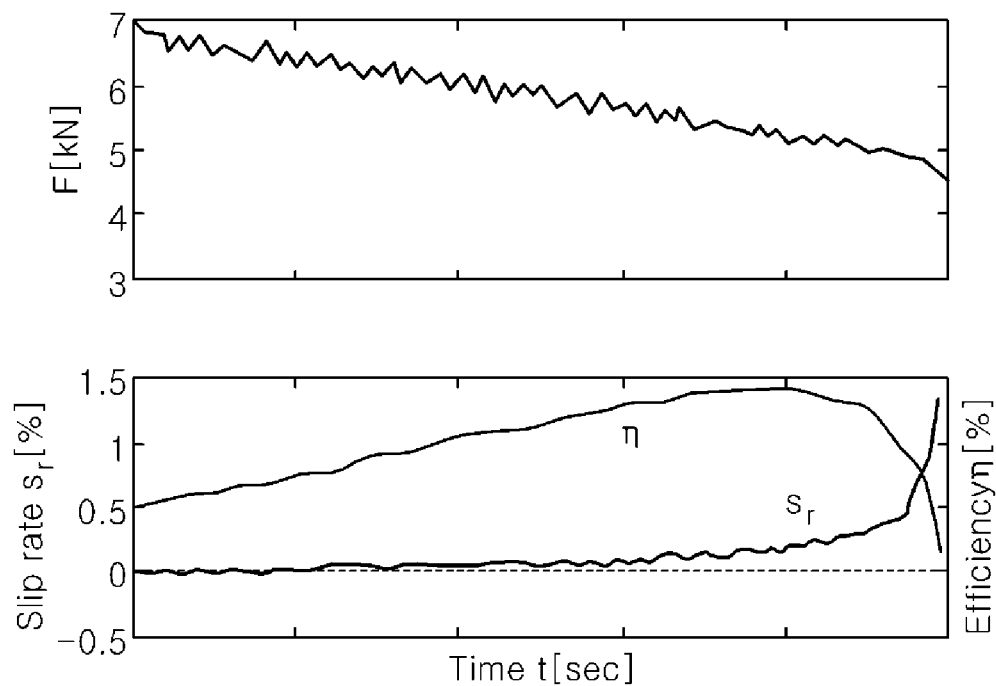
FIG. 1 is a graph showing the relationship of changes in a slip ratio and a CVT efficiency, when clamp force linearly decreases at a constant ratio as time passes.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

The theoretical background of the present invention is described first as follows.

As a CVT transmission ratio, there are a geometrical transmission ratio and a transmission ratio by the actual speed. The geometrical transmission ratio is determined by the geometrical position of a driving pulley, a driven pulley, and a belt and the transmission ratio by the actual speed is expressed by adding the relative slip amount of transmission ratio to the geometrical transmission ratio. When there is no slip, the geometrical transmission ratio and the transmission ratio by the actual speed are the same, and when the ratio of clamp force of the driving pulley and the driven pulley is kept constant, the transmission ratio of the CVT is kept constant.

The present invention finds a section where a change in transmission ratio is small and the transmission ratio is the minimum when fixing clamp force at any one of the driving pulley and the driven pulley and changing the clamp force at the other one, making the section as a section where a safety coefficient is 1, and controls the CVT with the optimum efficiency by controlling the CVT with the clamp force at the section.

That is, the present invention finds the optimum efficiency point by not using the relationship between the clamp force and slip, but using a change between the clamp force and transmission ratio, in order to find the point where the efficiency of the CVT is the optimum.

Figure 2:
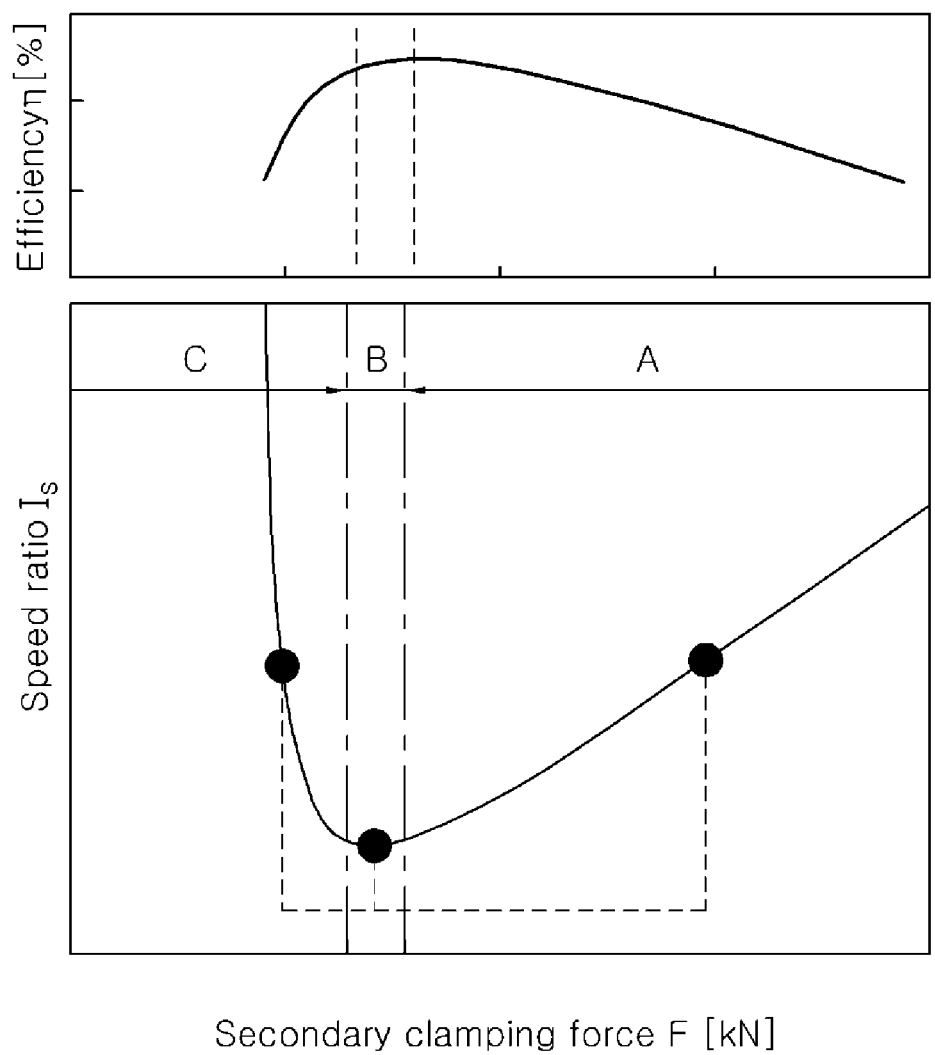
FIG. 2 is a graph showing changes in a transmission ratio and a CVT efficiency to changes in clamp force of a pulley in order to illustrate the operational principle of the present invention.

FIG. 2 show changes in a transmission ratio Is and efficiency when changing the clamp force F of a driven pulley, with the clamp force kept constant at a driving pulley.

The section A is a section where the safety coefficient is 1 or more, in which as the rigidity of the pulley changes with changes in clamp force, the actual geometrical transmission ratio Is changes and the transmission ratio Is of the CVT correspondingly changes.

The section B is a section where the safety coefficient is around 1 and that is used for common control of CVT, in which the CVT transmission ratio Is is not largely changed by the changes in clamp force F and the CVT efficiency η is the highest.

The section C is a section where the safety coefficient is less than 1, in which since the clamp force F cannot combine the pulleys with the belt, slip is generated and the actual transmission ratio Is changes, such that the transmission ratio Is of the CVT changes.

The present invention finds the section B from the sections described above by changing the clamp force F and observing changes in transmission ratio Is, and controls the clamp force on the basis of the changes.

Referring to FIG. 3, an exemplary embodiment of the present invention includes a first process S10 that fixes the clamp force of any one of a driving pulley and a driven pulley and a second process S20 that finds a section where the transmission ratio Is is the minimum while gradually decreasing the clamp force from the current clamp force ClampForce of the other pulley of which the clamp force is not fixed in the first process S10 and sets the clamp force in the section where the transmission ratio Is is the minimum as the clamp force ClampForceFinal of the other pulley, which is not fixed.

That is, the present invention selects a section where a change in transmission ratio Is to a change in the clamp force is the minimum in the second process S20 while fixing the clamp force of any one of the driving pulley and the driven pulley, for example, the clamp force of the driving pulley in the first process S10, and correspondingly controls the clamp force of the other pulley, for example the clamp force of the driven pulley.

The second process S20 includes a first step S21 that gradually decreases the clamp force from the current clamp force ClampForce of the other pulley of which the clamp force is not fixed in the first process S10 and decreases the clamp force by the force determined by the first reduction force/the number of times as the number of times increases until the transmission ratio Is decreases from a predetermined first reduction force ForceStep1, a second step S22 that repeats the first step S21 until the amount of change of the transmission ratio Is becomes under a predetermined first limit value Change_limit when the transmission ratio Is decreases, as a result of the first step S21, and a third step S23 that further decreases the clamp force after the second step S22 and determines as a final clamp force ClampForceFinal the clamp force ClampForce_old right before the transmission ratio Is increases while repetitively decreasing the clamp force by a predetermined second reduction force ForceStep2 until the transmission ratio Is increases.

In the step S21, it is determined whether the transmission ratio Is changes while controlling the pulley with the clamp force obtained by subtracting the current clamp force ClampForce from the first reduction force ForceStep1 and the clamp force is gradually decreased while the loop is progressed when the transmission ratio Is does not change, in which the decreased clamp force is determined by the value obtained by dividing the first reduction force ForceStep1 by the number of times N of the progressed loops, such that the clamp force is gradually decreased by a lower amount as the loop is progressed.

In step S22, the first step S21 is repetitively performed when the transmission ratio Is is decreased by performing the first step S21 until the degree of reduction becomes under the first limit value Change_limit, in which when the first step S21 is performed when the initial clamp force is in the section A, the clamp force decreases and moves to the section B, such that the clamp force enters the section B by repetitively performing the first step S21.

Therefore, the first limit value Change_limit may be appropriately selected by a test and analysis at a level where the change of the clamp force enters the section B and it can be determined that the change is not large, and the first reduction force ForceStep1 may be appropriately selected by a test and analysis at a level where it can accurately enter the second B within a relatively short time.

In the third step S23, whether the transmission ratio Is increases is determined by decreasing the clamp force by the second reduction force ForceStep2 while the loop is progressed, which is for finding whether the clamp force moves from the section B to the section C, in which when the transmission ratio Is starts to increase, the clamp force Clamp-Force_old right before the transmission ratio Is increases makes the minimum transmission ratio Is and is determined as the clamp force where the efficiency η of the CVT is the maximum, and control is correspondingly performed.

For reference, even if the initial clamp force is in the section C, it approaches the section B by performing the first step S21 and it is possible to determine whether it moves to the section A by the third step S23 to be described below, which is performed by the same principle as the above.

On the other hand, it may be preferable that the second reduction force ForceStep2 is set smaller than the first reduction force ForceStep1. That is, it is possible to accurately and quickly find the point where the transmission ratio Is becomes the minimum, by decreasing the clamp force by a relatively small width and finding the point where the transmission ratio Is increases, after finding the section B by decreasing the clamp force by a relatively small width.

When the number of times that decreases the clamp force by the second reduction force ForceStep2 becomes equal to or more than a predetermined limit number of times N_limit in the third step S23, a fourth step S24 that determines the current clamp force ClampForce as the final clamp force ClampForceFinal is further included.

This is because when the transmission ratio Is does not increase again even by decreasing the clamp force by the second reduction force ForceStep2 above the limit number of times N_limit, the transmission ratio is likely to have already reached the minimum transmission ratio Is and it is required to ensure rapidity for the control, such that it may be preferable to determine the clamp force at the time as the final clamp force ClampForceFinal.

As described above, according to the clamp for control method for a CVT of the present invention, it is possible to ensure the efficiency η of the CVT at the optimum level and improve fuel efficiency of a vehicle by determining changes in clamp force and corresponding changes in transmission ratio Is without using a specific expensive sensor, and finding the optimum clamp force for controlling the pulleys.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A clamp force control method for a continuous variable transmission, comprising:
   fixing a first clamp force of any one of a driving pulley and a driven pulley;
   finding a section B where a minimum of a transmission ratio occurs by decreasing a second clamp force of the other one of the driving pulley and the driven pulley; and
   setting a smallest clamp force in the section B where the transmission ratio is the minimum as the second clamp force of the other one of the driving pulley and the driven pulley.

2. The method as defined in claim 1, wherein the finding of the section B includes:
   (i) decreasing the second clamp force by a predetermined first reduction force;
   (ii) determining whether the transmission ratio decreases after the second clamp force is decreased;
   (iii) if the transmission ratio does not decrease, decreasing the second clamp force by a reduction force and repeating (ii), wherein the reduction force is calculated based on the predetermined first reduction force and a number of repeats;
   (iv) if the transmission ratio decreases, determining whether a change of the transmission ratio is less than a predetermined first limit value;
   (v) repeating (i)-(iv), if the change of the transmission ratio is not less than the predetermined first limit value;
   (vi) decreasing further the second clamp force by a predetermined second reduction force, if the change of the transmission ratio is less than the predetermined first limit value;
   (vii) determining whether the transmission ratio increases after the second clamp force is further decreased by the predetermined second reduction force;
   (viii) repeating (vi) and (vii), if the transmission ratio does not increase; and
   (ix) setting a final clamp force, if the transmission ratio increases, wherein the final clamp force corresponds to where the transmission ratio changes from decreasing to increasing.

3. The method as defined in claim 2, wherein the second reduction force is set smaller than the first reduction force.

* * * * *